United States Patent [19]
Chen et al.

[11] Patent Number: 6,118,909
[45] Date of Patent: Sep. 12, 2000

[54] ATHERMAL OPTICAL DEVICES

[75] Inventors: Jerry Chia-yung Chen, Arlington, Mass.; Corrado Dragone, Little Silver, N.J.; Yuan P. Li, Norcoss, Ga.

[73] Assignee: Lucent Technologies Inc., Murray Hill, N.J.

[21] Appl. No.: 09/022,338

[22] Filed: Feb. 11, 1998

Related U.S. Application Data

[63] Continuation-in-part of application No. 08/941,976, Oct. 1, 1997.

[51] Int. Cl.$^7$ ........................................................ G02B 6/26
[52] U.S. Cl. ................................ 385/15; 385/14; 385/46; 385/131; 385/132
[58] Field of Search ............................... 385/14, 46, 129, 385/131, 132, 141

[56] References Cited

U.S. PATENT DOCUMENTS

| | | | |
|---|---|---|---|
| 5,002,350 | 3/1991 | Dragone | 385/124 |
| 5,488,680 | 1/1996 | Dragone | 385/24 |
| 5,799,118 | 8/1998 | Ogusu et al. | 385/14 |

OTHER PUBLICATIONS

"A Temperature Insensitive InGaAsP–InP Optical Filter" by H. Tanobe et al., IEEE Photonics Technology Letters, vol. 8, No. 11, Nov. 1996, pp. 1489–1491.

"Polymer Optical Add/Drop Filter Based on a Cascaded Mach–Zehnder Configuration", by C. Kostrzewa et al., ECOC 96, 4 pages.

"Temperatures–independent narrowhead optical filter at 1.3 αm wavelength by an athermal waveguide", by Y. Kokubum et al., Electronics Letters, 10th Oct. 1996, vol. 32, No. 21, pp. 1998–2000.

"Athermal Waveguides for Temperature–Independent Lightwave Devices", by Yasuo Kokubun et al., IEEE Photonics Technology Letters, vol. 5, No. 11, Nov. 1993, pp. 1297–1300.

"A Novel Negative Expansion Substrate Material For Atheralizing Fiber Bragg Gratings", by D.L. Weidman et al., MoB.3.5 22nd European Conferance on Optical Communication—ECOC'96, Oslo, pp. 1.61–1.64.

"Athermal silica–based arrayed–wavelength grating (AWG) multiplexer", by Yasuyuki Inoue et al., ECOC 97, Sep. 22–25, 1997, Conference Publication No. 448, IEE, 1997, pp. 33–36.

"Temperature–Insensitive arrayed waveguide gratings on InP substrates", by H. Tanobe et al., OFC '97 Technical Digest, pp. 298–299.

"Three–dimensional athermal for temperature independent lightwave devices", by Y. Kokubun et al., Electronics Letters, Jul. 21st, 1997, vol. 33, No. 5, pp. 417–419.

"Temperature compensation technique for fibre Bragg gratings using liquid crystalline polymer tubes", by T. Iwashima et al., Electronics Letters, Feb. 27th, 1997, vol. 33, No. 5, pp. 417–419.

*Primary Examiner*—Hung N. Ngo

[57] ABSTRACT

Optical devices, such as wavelength routers, having a plurality of waveguides of differing lengths, with improved independence to temperature fluctuations. Improved temperature independence is achieved by varying the cross-section of the device waveguides. Cross-section variation can be implemented in one or more of the following ways: selectively applying a temperature-compensating material (e.g., a polymer) over portions of the waveguides, and/or varying the dimensions and/or compositions of the materials used in the waveguides, either along each waveguide or between waveguides or both. By carefully designing the devices, the temperature effects resulting from the different lengths of the different waveguides can be compensated to produce a relatively temperature-independent device. The index of refraction of the temperature-compensating material changes with temperature in the same direction as the indices of refraction of the rest of the waveguide materials, and the effective length of the portion of a waveguide covered by the temperature-compensating material is inversely proportional to the effective length of the waveguide.

17 Claims, 6 Drawing Sheets

# ATHERMAL OPTICAL DEVICES

CROSS-REFERENCES TO RELATED APPLICATIONS

This is a continuation-in-part of co-pending application Ser. No. 08/941,976, entitled "Method and Apparatus for Reducing Temperature-Related Spectrum Shifts in Optical Devices," filed on Oct. 1, 1997, as attorney docket no. Henry 36-8, using Express Mail Label No. 1B563509683, the teachings of which are incorporated herein by reference.

BACKGROUND OF THE INVENTION

1. Field of the Invention

The present invention relates to optical devices, such as wavelength routers and optical multiplexers, used in light-based telecommunications and computer networks.

2. Description of the Related Art

The demand for higher and higher communication and computer data rates implies a constant need for newer and better technologies to support that demand. One such technology area is fiber-optic communications, in which data is transmitted as light energy over optical fibers. To increase data rates, more than one data channel can be placed on a single fiber link. For example, in wavelength division multiplexing (WDM), the different channels are differentiated by wavelength or color. Such techniques require special components to combine and/or separate the different channels for transmission, switching, and/or receiving.

A wavelength router (also known as a waveguide grating router, an arrayed waveguide grating, or a phased array) is an optical device that can be used to combine and/or separate light energy of different wavelengths. A wavelength router selectively routes light of a particular wavelength from an input port to an output port. When used to route light of differing wavelengths from more than one input port and/or to more than one output port, a wavelength router can be used to operate as an optical multiplexer and/or demultiplexer that combines and/or separates light energy of different wavelengths.

Figure 1:
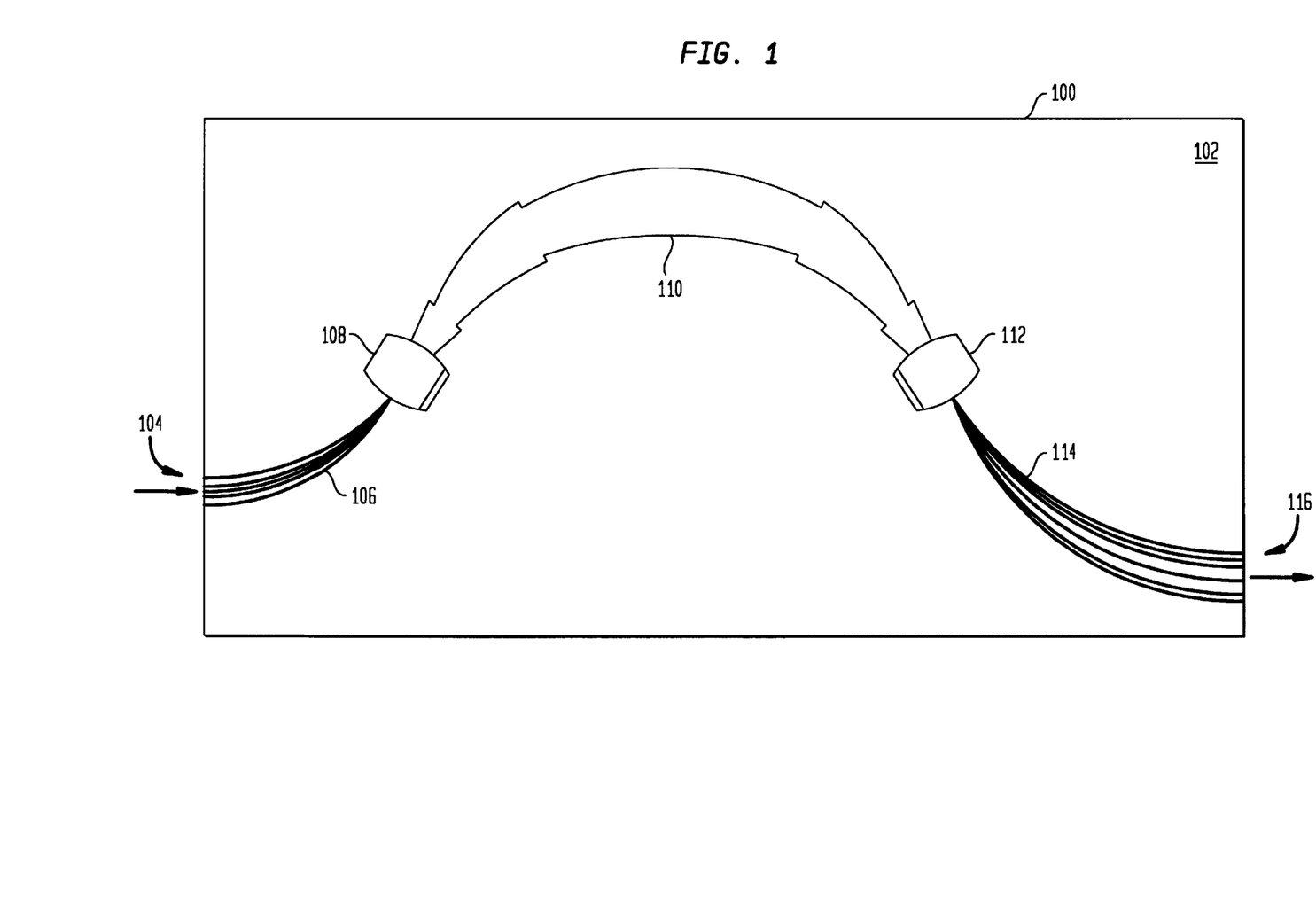
FIG. 1 shows a schematic diagram of a conventional wavelength router.

FIG. 1 shows a schematic diagram of a conventional wavelength router 100 implemented as an integrated device formed on a suitable substrate 102 (e.g., silicon or silica). Router 100 has a plurality of input waveguides 106 adapted to receive light from one or more incoming optical fibers that can be connected to one or more of the input ports 104. Router 100 also has a plurality of output waveguides 114 adapted to transmit light to one or more outgoing optical fibers that can be connected to one or more of the output ports 116. Between the input and output waveguides are two free spaces 108 and 112 separated by a set of waveguides that form the arms 110 of the router.

In operation, light received at one of the input ports 104 is transmitted along the corresponding input waveguide 106 to free space 108. Light entering free space 108 gets radiated for receipt by—and transmission along—each of the router arms 110 towards free space 112. Light entering free space 112 gets radiated towards the output waveguides 114.

Wavelength router 100 is preferably designed such that all of the optical distances from a particular location at the input side of free space 108 (i.e., where one particular of the input waveguides 106 meets free space 108) along each router arm 110 to a particular location on the output side of free space 112 (i.e., where one particular of the output waveguides 114 meets free space 112) differ by an integer multiple of a particular wavelength for the different router arms. As such, light of that particular wavelength entering free space 108 from that particular input waveguide 106 will be focused on the output side of free space 112 at that particular output waveguide 114. That is, light of that particular wavelength will constructively interfere (i.e., add in phase) at that particular output waveguide location, and substantially destructively interfere at all other output waveguide locations. Moreover, light of most other wavelengths will not, in general, be focused (i.e., will effectively destructively interfere) at that particular output waveguide location. As such, wavelength router 100 can be used as an optical passband filter.

Furthermore, to the extent that wavelength router 100 can be designed to focus light having different wavelengths at different output waveguide locations on the output side of free space 112, router 100 can operate as a one-to-many optical multiplexer that can receive light of different wavelengths from a single incoming optical fiber and selectively transmit those different frequencies to different output ports for propagation along different outgoing optical fibers. Similarly, router 100 can be further designed to operate as a many-to-one optical demultiplexer that receives different wavelength light from different incoming optical fibers for transmission to a single outgoing optical fiber, or as a many-to-many optical multiplexer that receives different wavelength light from different incoming optical fibers for transmission to different outgoing optical fibers. Moreover, router 100 may be a symmetric optical device that can be operated in either direction (i.e., either from left to right or from right to left in FIG. 1). Typically, the router is realized using silica waveguides deposited on a thick substrate of quartz or silicon.

Since optical communications systems are typically deployed in the real world, they must operate effectively over a relatively wide range of temperatures. As such, it is desirable to design optical devices such as wavelength routers whose operating characteristics do not change significantly over that temperature range. Due to thermal expansion and index changes, changes in temperature can result in changes in the optical path lengths of the router arms. Since the router arms have different lengths, the optical path lengths of the different router arms will change by different amounts. This can adversely affect the ability of a wavelength router to operate effectively as temperature changes. Previous attempts to design athermal wavelength routers, that is, routers that are relatively independent to temperature fluctuations, have ultimately proven unsatisfactory. Consequently, the temperatures of wavelength routers are controlled by expensive heaters. Typical heaters require a few watts of power. This power requirement limits the use of wavelength routers in outside plant (non-central office) locations and in remote locales (such as in the ocean).

SUMMARY OF THE INVENTION

The present invention is directed to optical devices, such as wavelength routers, having a plurality of waveguides of differing lengths. The present invention improves the independence of these optical devices to temperature fluctuations. This improved temperature independence is achieved by applying temperature-compensating material. This material is placed only near selected areas of the device. Careful design permits modification of the temperature characteristics of the device.

In particular, the present invention is directed to an integrated optical device for routing light energy, comprising a plurality of waveguides of differing length. A temperature-compensating material, having an index of refraction that changes differently with temperature from the indices of refraction of the rest of the materials used in the waveguides, is applied to only a portion of each waveguide to vary the cross-sections of the waveguides to improve temperature independence of the device. The index of refraction of the temperature-compensating material changes with temperature in the same direction as the indices of refraction of the rest of the waveguide materials, and the effective length (e.g., optical length) of the portion of a waveguide covered by the temperature-compensating material is inversely proportional to the effective length of the waveguide.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 2:
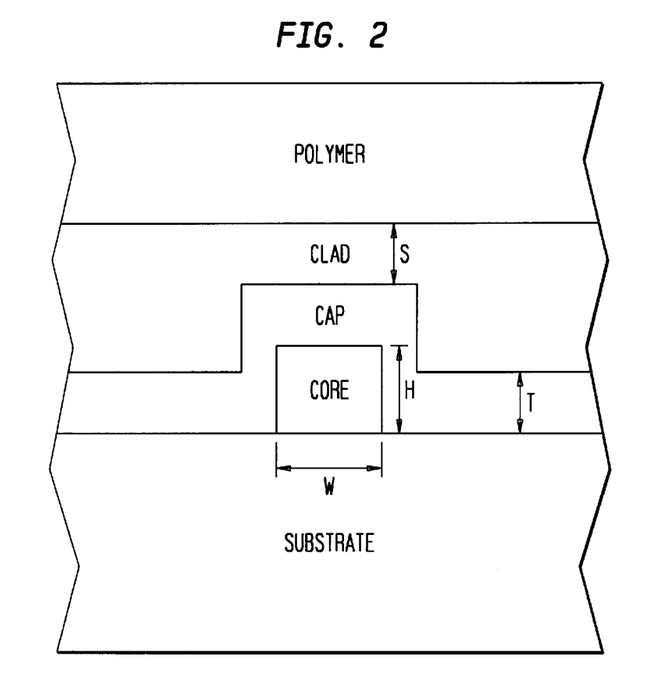
FIGS. 2 and 3 show schematic representations of the cross sections of each waveguide arm in a wavelength router, such as the wavelength router of FIG. 1, according to two different configurations.
Figure 3:
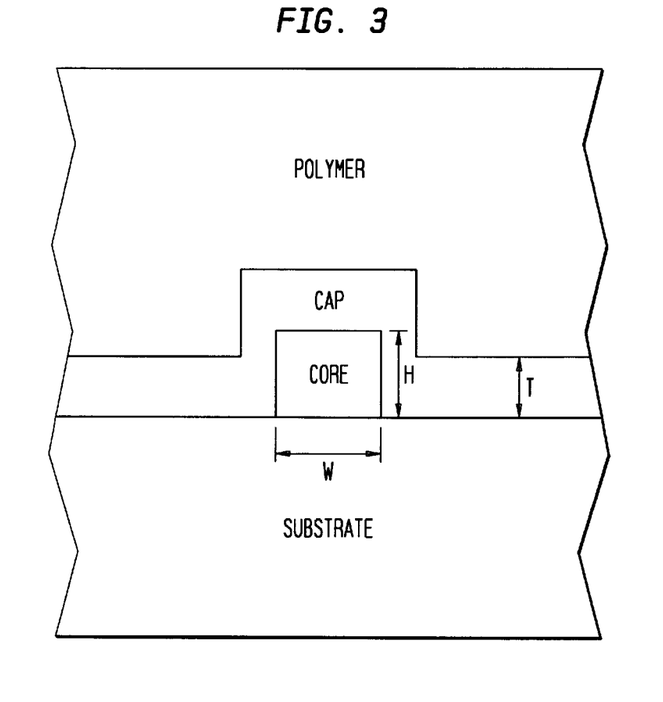

FIGS. 2 and 3 show schematic representations of the cross sections of each router arm waveguide in a wavelength router, such as wavelength router 100 of FIG. 1, according to two different configurations. According to the configuration of FIG. 2, the waveguide comprises a core on a substrate, with a cap layer over the core, a clad layer over the cap, and a layer of polymer over the cap. In the configuration of FIG. 3, there is no clad layer and the polymer is applied directly over the cap. The core has a width W and a height H, the thickness of the cap is T, and the thickness of the clad is S (the polymer-guide separation). In a typical embodiment, the substrate, core, cap, and clad are all made from silicon dioxide ($SiO_2$) variously doped to yield composite materials with different optical properties (e.g., index of refraction) to enable the propagation of light along the waveguide. The polymer is added to reduce the dependence of router operation to changes in temperature, as described below. For purposes of this specification, the term polymer refers to any material with negative dn/dT or α. Thus, in addition to normal polymers which have a negative dn/dT, the term as used herein also refers to materials having a negative α, such as specialty glass like β-eucryptite. Note that, in some cases, the cap layer does not exist.

The indices of refraction n of semiconductor materials, such as $SiO_2$, tend to increase with temperature T. That is, dn/dT>0, for semiconductor materials. But with higher temperatures, the indices of refraction of certain polymers tend to decrease. That is dn/dT<0, for polymers. If a waveguide is constructed using both polymers and semiconductors, then the overall or effective index of refraction for a mode of light traveling down that waveguide can be made relatively insensitive to temperature fluctuations. This occurs when the change in effective index of refraction balances the thermal expansion, that is, when dn/dT=−nα, where α is the thermal expansion coefficient of the material system. Satisfying this relationship requires a careful design of the waveguide's cross-section, e.g., selecting the waveguide dimensions W, H, T, and S, as well as the indices of refraction for all of the layers in FIGS. 2 and 3, in order to produce an effective index of refraction that has a low temperature dependence. To achieve this temperature independence, S and/or T may need to be set to zero.

Figure 4:
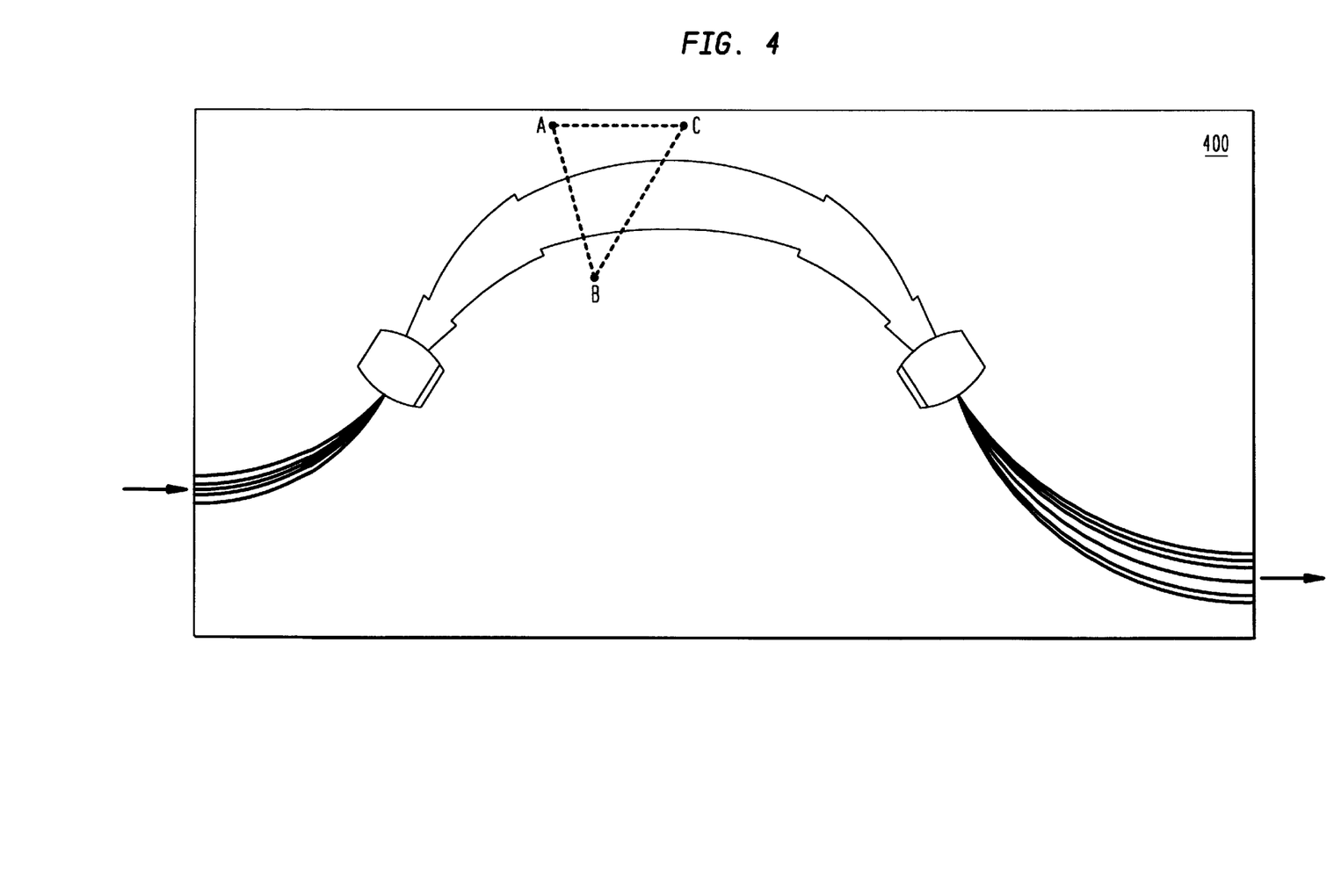
FIGS. 4–7 show a schematic diagram of wavelength routers, according to different embodiments of the present invention.

FIG. 4 shows a schematic diagram of a wavelength router 400, according to one embodiment. According to this embodiment, a polymer is applied to cover only a portion of the arms of router 400, for example, the portion bounded by the triangle ABC. The remaining portions of the router arms may be covered by polyimide, a low-index $SiO_2$, or nothing (i.e., air). That is, for the remaining portions, the polymer layers shown in FIGS. 2 and 3 would be replaced or simply omitted.

As described in the background section, the frequency-selective properties of a wavelength router depend on constant path-length (or phase) differences between adjacent arms. In order to compensate for temperature dependence, it is sufficient to apply the compensating material (in this case, a polymer) to a patch corresponding to those path-length differences. Generally, this patch is, but need not be, triangular. The exact shape may depend on the particular layout of the grating arms. If, for example, triangle ABC is chosen such that the uncompensated portions of the arms (i.e., the portions outside of triangle ABC) all have the same path length, then the compensated portions will correspond to the differences in path length between the different arms. As such, the effects of any temperature dependence in the uncompensated portions of the router arms will be the same for each arm, while the polymer, with appropriate selection of the grating dimensions and composite materials, will provide proportional compensation for the different lengths between the arms, thereby maintaining the phase differences between the arms. The result is a wavelength router that is relatively insensitive to temperature fluctuations.

Figure 5:
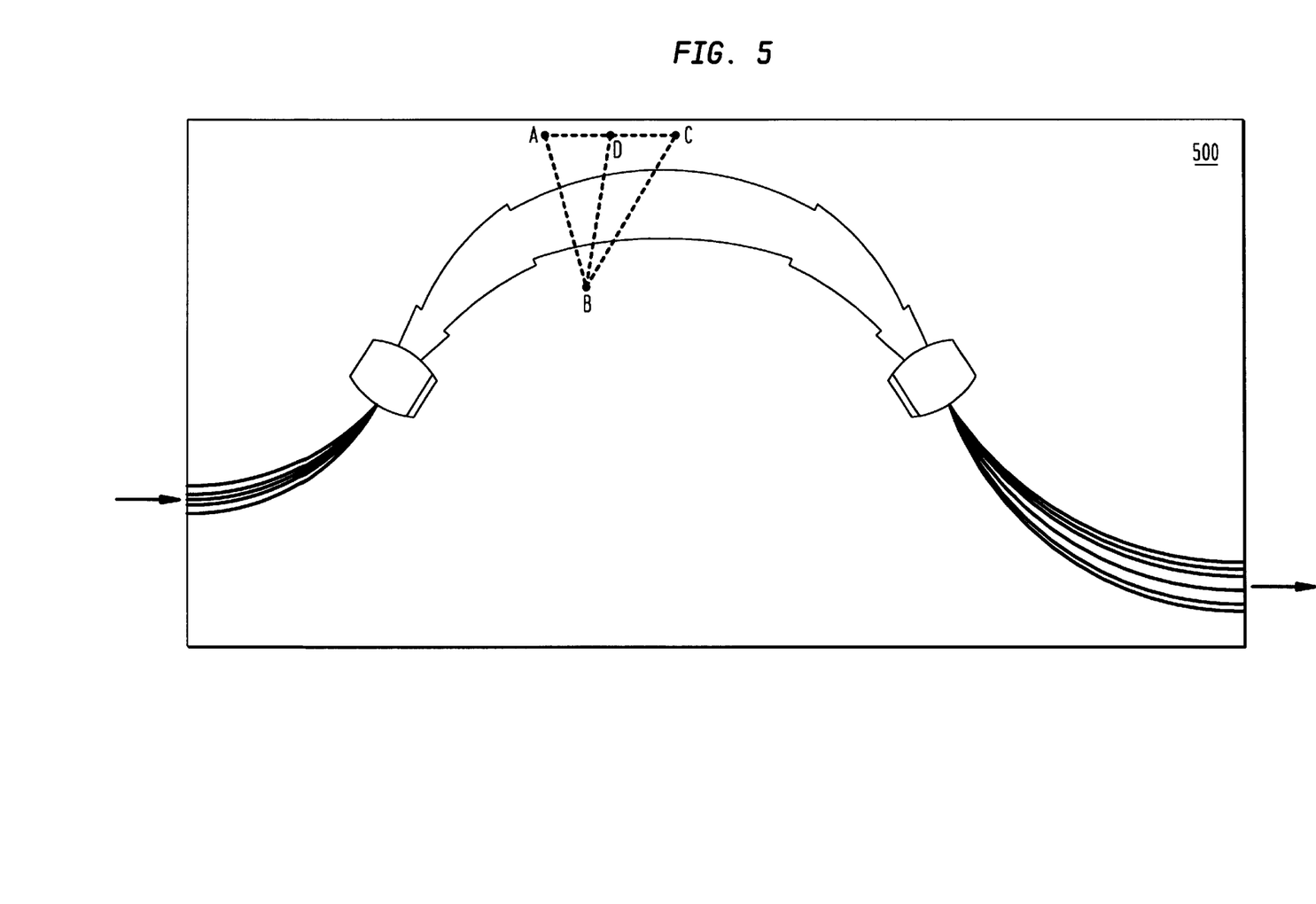

FIG. 5 shows a schematic diagram of a wavelength router 500, according to an alternative embodiment. According to this embodiment, the polymer used for temperature compensation has an optical path length $P_5$ that changes even more negatively with increasing temperature than the optical path length $P_4$ of the polymer used in router 400 of FIG. 4. That is, $dP_5/dT < dP_4/dT < 0$. As such, in this embodiment, temperature compensation can be achieved by applying the polymer to an even smaller portion of the router arms, for example, triangle ABD instead of triangle ABC as in FIG. 4. In this case, the phase in triangle ABD would decrease with increasing temperature, while the phase in triangle DBC would increase. For a given polymer, the size of triangle ABD can be selected to have the two effects cancel each other out, thereby achieving the same degree of temperature insensitivity as that achieved by router 400.

By definition, P=nL, where n is the index of refraction and L is the distance light travels through the material. As such dP/dT=Ldn/dT+ndL/dT. Since the expansion coefficient α is defined as α=(1/L)dL/dT, then dP/dT=Ldn/dT+nLα=P(1/ndn/dT+α). Temperature compensation is achieved when dP/dT=0. This occurs when dn/dT=−nα.

Figure 6:
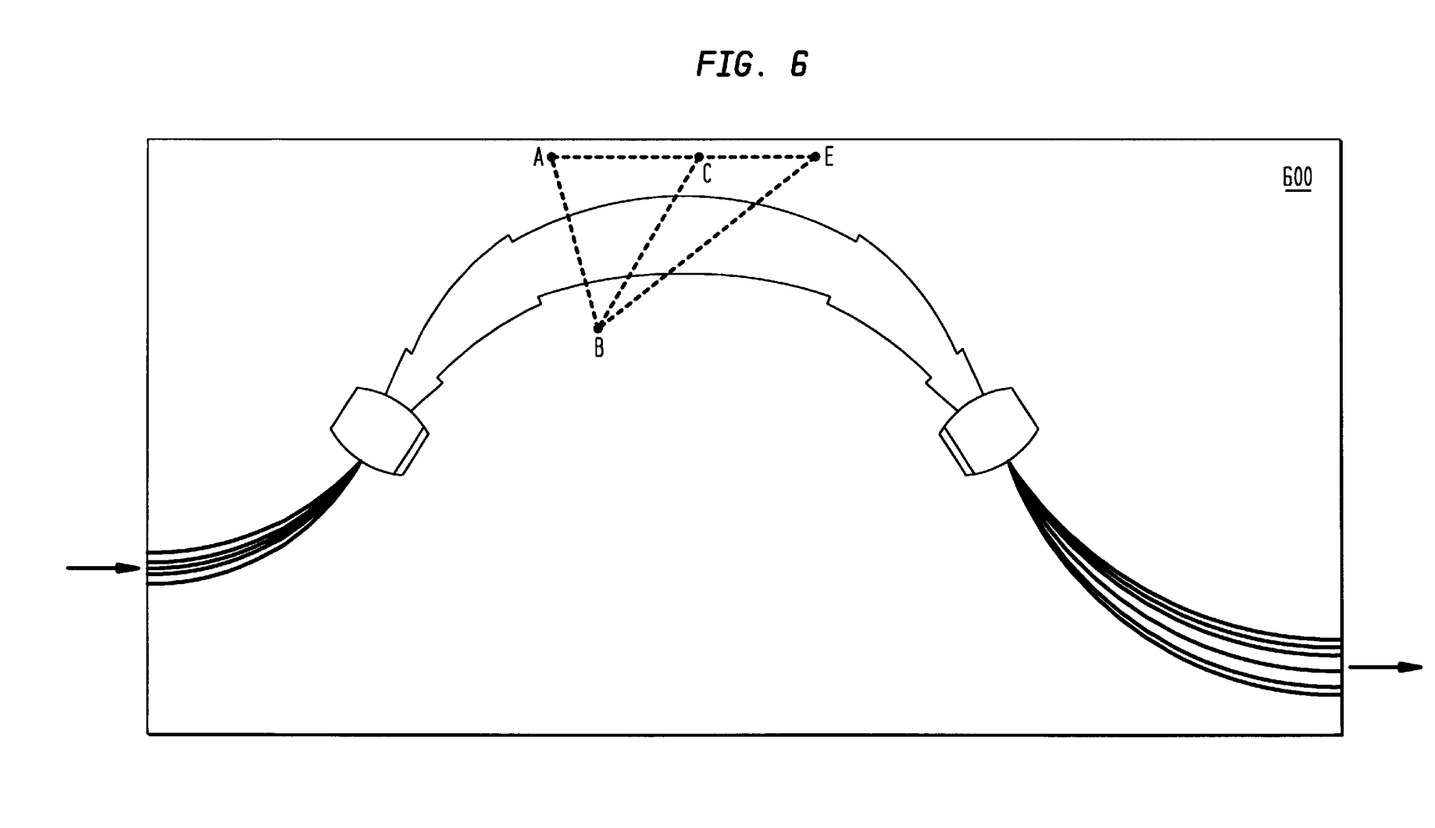

FIG. 6 shows a schematic diagram of a wavelength router 600, according to another alternative embodiment. According to this embodiment, the polymer used for temperature compensation has an optical path length $P_6$ that changes less negatively with increasing temperature than the optical path length $P_4$ of the polymer used in router 400 of FIG. 4. That is, $dP_4/dT < dP_6/dT < 0$. As such, in this embodiment, temperature compensation can be achieved by applying the polymer to a larger portion of the router arms, for example, triangle ABE instead of triangle ABC as in FIG. 4. In this case, the phase in triangle ABE would decrease relatively slowly with increasing temperature. For a given polymer, the size of triangle ABE can be selected to achieve the same degree of temperature insensitivity as that achieved by routers 400 and 500.

Figure 7:
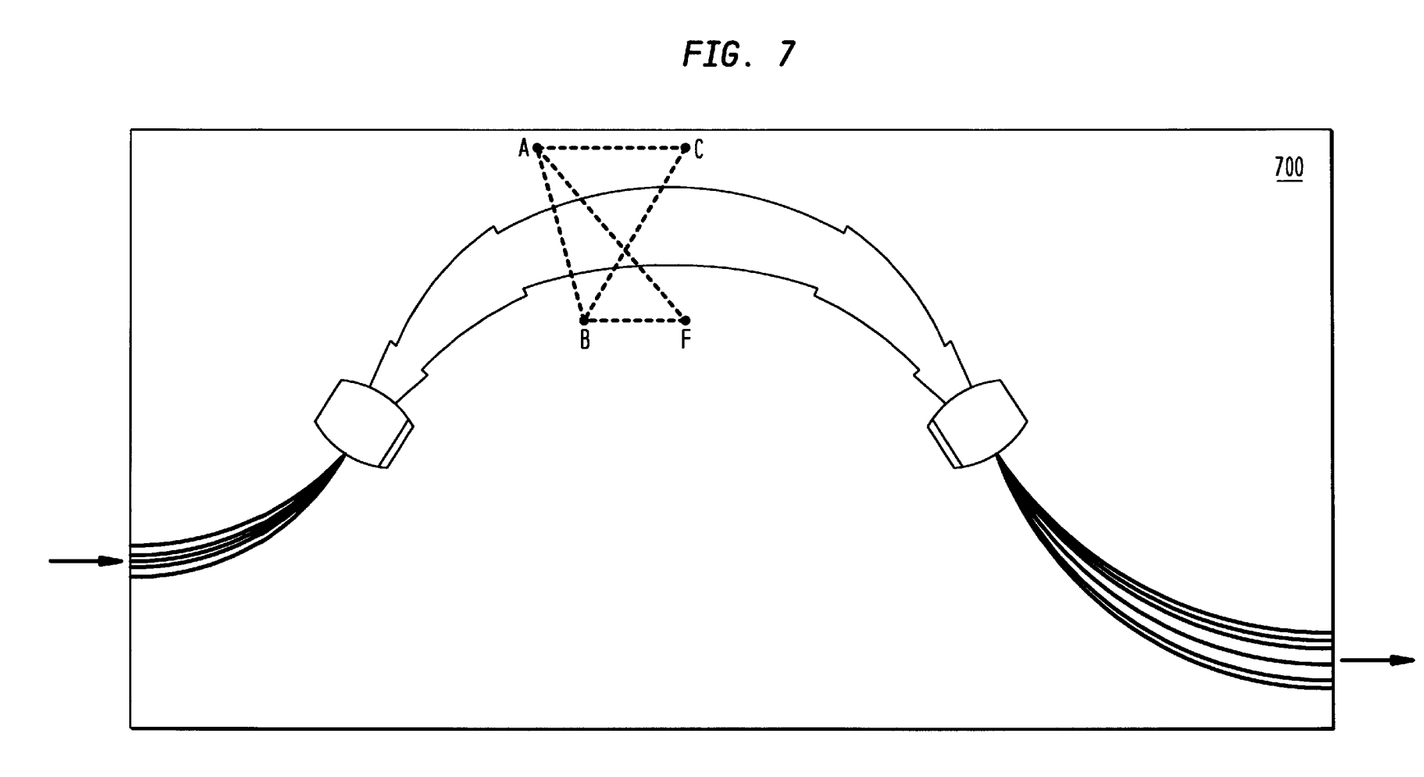

FIG. 7 shows a schematic diagram of a wavelength router 700, according to one embodiment of the present invention. According to this embodiment, the polymer used for temperature compensation has an optical path length $P_7$ that increases with increasing temperature to an extent greater than the optical path length $P_c$ of the $SiO_2$-based composite materials used in the other layers of the waveguides. That is, $dP_7/dT > dP_c/dT > 0$. As such, in this embodiment, temperature compensation can be achieved by applying the material to an inverted rectangular portion of the router arms, for example, triangle BAF instead of triangle ABC as in FIG. 4. In this case, the shorter router arms will have more temperature-compensating material than the longer router arms. The greater increase in optical path length due to thermal expansion in the longer router arms will be compensated by the fact that the shorter router arms will have more temperature-compensating material. Once again, the size of triangle BAF can be selected to achieve the same degree of temperature insensitivity as that achieved by routers 400, 500, and 600.

In the embodiments of FIGS. 4–7, the temperature-compensating material is applied to triangular portions of the router arms. It will be understood that the present invention can be implemented by applying the temperature-compensating material in patterns other than triangles, as long as the material compensates for the temperature effects that result from the differences in lengths between the different routing arms.

As broadly conceived, the present invention is directed to optical devices, such as a wavelength router, that have a plurality of waveguides of different lengths, such as the router arms of a wavelength router. According to the present invention, the temperature independence of these devices is improved by varying the cross-section of the waveguides. In the wavelength router embodiments of FIGS. 4–7, this variation in cross-section is manifested by some portions of the router arms having a temperature-compensating material, such as a polymer, applied, while that material is not applied to the other portions of those router arms. In these embodiments, the cross-section of the router arms changes along the length of the router arms.

According to the present invention, variations in cross-section can be achieved in other ways, either in conjunction with or instead of the variation along the length of the waveguides relating to the application of temperature-compensating material. As used in this patent application, the term "variations in cross-section" is not limited to only the application or non-application of a temperature-compensating material along the length of the waveguides. That term also covers, for example, the variations in the dimensions of the waveguide levels as well as variations in the compositions of those levels. Moreover, variations in the cross-section covers both variations along the length of individual waveguides as well as variations between waveguides. The variations may be continuous, as in a gradual change in the thickness of a layer, or discontinuous, as in the transition from one portion of a waveguide having polymer applied to another portion without polymer.

As mentioned, an alternative technique for compensating for temperature effects in wavelength routers is to change the dimensions of the cross-section of the waveguides that form the router arms. For example, the sizes of one or more of waveguide dimensions W, H, T, and S can be changed over different lengths of the router arms in specific ways to control the temperature characteristics of the router arms. Similarly, the composition of the waveguide materials (e.g., levels of doping) can be varied along the lengths of the router arms to change the indices of refraction and thereby control the temperature characteristics.

In yet other techniques of the present invention, one or more of the dimensions or composite materials of the router arms differ from arm to arm. In this case, if the dimensions and compositions are constant along each arm, fabrication is simplified by eliminating the photolithography and etching steps used to produce wavelength routers that vary along the lengths of their router arms.

It will be further understood that the principles of the present invention can be applied to optical devices having multiple waveguides of differing lengths, other than wavelength routers. Devices according to the present invention can be used for different applications including detectors, lasers, multiplexers/demultiplexers, add/drop filters, 1×N and N×1 splitters, and N×N arrays. The devices can be implemented in any suitable materials including, substituting other semiconductors (e.g., Si, InP, GaAs) for the $SiO_2$ in the waveguides and/or using a polyimide or other material having a negative dn/dT for the polymer. Different devices can be designed to operate with light energy of different wavelength ranges including visible or microwave.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An integrated optical device for routing light energy, comprising a plurality of waveguides of differing length, wherein:

a temperature-compensating material, having an index of refraction that changes differently with temperature from the indices of refraction of the rest of the materials used in the waveguides, is applied to only a portion of each waveguide to vary the cross-sections of the waveguides to improve temperature independence of the device; and the index of refraction of the temperature-compensating material changes with temperature in the same direction as the indices of refraction of the rest of the waveguide materials, and the effective length of the portion of a waveguide covered by the temperature-compensating material is inversely proportional to the effective length of the waveguide.

2. The invention of claim 1, wherein the device is a wavelength router comprising a plurality of router arms of differing length.

3. The invention of claim 1, wherein the waveguide composite materials are semiconductor materials, the index of refraction of the temperature-compensating material changes with temperature more than the indices of refraction of the semiconductor materials, and the temperature-compensating material is applied to the waveguides in a region defined by an inverted triangle.

4. The invention of claim 1, wherein the lengths of the portions of the waveguides covered by the temperature-compensating material are a function of the differences in lengths between the waveguides.

5. The invention of claim 1, wherein the waveguide comprises a core on a substrate, with a cap over the core, wherein the temperature-compensating material is applied over the waveguide.

6. The invention of claim 5, wherein the waveguide further comprises a clad between the cap and the temperature-compensating material.

7. The invention of claim 1, wherein the cross-sections of the waveguides vary from waveguide to waveguide.

8. The invention of claim 7, wherein the dimensions of the waveguides vary from waveguide to waveguide.

9. The invention of claim 7, wherein the composition of the materials using the waveguides varies from waveguide to waveguide.

10. The invention of claim 1, wherein the cross-sections of the waveguides vary along the lengths of the waveguides.

11. The invention of claim 10, wherein the dimensions of the waveguides vary along the lengths of the waveguides.

12. The invention of claim 10, wherein the composition of the materials used in the waveguides varies along the lengths of the waveguides.

13. The invention of claim 10, wherein cross-sections of the waveguides vary discontinuously.

14. The invention of claim 10, wherein the cross-sections of the waveguides vary continuously.

15. The invention of claim 1, wherein:

the device is a wavelength router comprising a plurality of router arms of differing length;

the lengths of the portions of the waveguides covered by the temperature-compensating material are a function of the differences in lengths between the waveguides; and the waveguide comprises a core on a substrate, with a cap over the core, wherein the temperature-compensating material is applied over the waveguide.

16. The invention of claim 15, wherein:

the index of refraction of the temperature-compensating material changes with temperature in the same direction as the indices of refraction of the rest of the waveguide materials, and the length of the portion of a waveguide covered by the temperature-compensating material is inversely proportional to the length of the waveguide; and the waveguide composite materials are semiconductor materials, the index of refraction of the temperature-compensating material changes with temperature more than the indices of refraction of the semiconductor materials, and the temperature-compensating material is applied to the waveguides in a region defined by an inverted triangle.

17. The invention of claim 15, wherein the waveguide further comprises a clad between the cap and the temperature-compensating material.

* * * * *

UNITED STATES PATENT AND TRADEMARK OFFICE
CERTIFICATE OF CORRECTION

PATENT NO. : 6,118,909
DATED : September 12, 2000
INVENTOR(S) : Jerry Chia-yung Chen, Corrado Dragone, and Yuan P. Li It is certified that error appears in the above-identified patent and that said Letters Patent is hereby corrected as shown below:

On the title page in Section 56, References Cited, OTHER PUBLICATIONS, replace:

"Three-dimensional athermal for temperature independent lightwave devices", by Y. Kokubun et al., Electronics Letters, Jul. 21st, 1997, Vol. 33, No. 5, pp. 417-419." with -- "Three-dimensional athermal waveguides for temperature independent lightwave devices", by Y. Kokubun et al., Electronics Letters, 21st July 1994, Vol. 30, No. 15, pgs. 1223-1224.--

Signed and Sealed this

Twenty-fourth Day of April, 2001

Attest:

NICHOLAS P. GODICI

Attesting Officer      Acting Director of the United States Patent and Trademark Office